United States Patent
Moraveji (10) Patent No.: US 8,020,097 B2
(45) Date of Patent: Sep. 13, 2011

(54) RECORDER USER INTERFACE

(75) Inventor: Neema M. Moraveji, Beijing (CN)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 11/277,130

(22) Filed: Mar. 21, 2006

(65) Prior Publication Data

US 2007/0226254 A1 Sep. 27, 2007

(51) Int. Cl.
*G06F 17/00* (2006.01)
(52) U.S. Cl. .................................. 715/716; 707/104.1
(58) Field of Classification Search .................. 715/716, 715/717, 719, 723, 764; 707/10, 104.1
See application file for complete search history.

(56) References Cited

U.S. PATENT DOCUMENTS

| | | | |
|---|---|---|---|
| 6,839,059 B1 * | 1/2005 | Anderson et al. | 345/501 |
| 6,961,446 B2 * | 11/2005 | Imagawa et al. | 382/103 |
| 6,977,673 B1 * | 12/2005 | McKain et al. | 348/207.99 |
| 7,177,872 B2 * | 2/2007 | Schwesig et al. | 707/10 |
| 7,508,444 B1 * | 3/2009 | Napoli et al. | 348/372 |
| 2002/0126141 A1 * | 9/2002 | Mastronardi | 345/716 |
| 2002/0154156 A1 * | 10/2002 | Moriwake et al. | 345/716 |
| 2003/0165319 A1 * | 9/2003 | Barber et al. | 386/46 |
| 2004/0041830 A1 * | 3/2004 | Chiang et al. | 345/716 |
| 2005/0154987 A1 * | 7/2005 | Otsuka et al. | 715/716 |
| 2005/0206751 A1 * | 9/2005 | Manico et al. | 348/239 |
| 2005/0234875 A1 * | 10/2005 | Auerbach et al. | 707/3 |
| 2006/0053373 A1 * | 3/2006 | Tan et al. | 715/716 |
| 2007/0240072 A1 * | 10/2007 | Cunningham et al. | 715/764 |
| 2007/0250774 A1 * | 10/2007 | Moon et al. | 715/716 |
| 2007/0256014 A1 * | 11/2007 | Du Breuil | 715/716 |
| 2008/0033757 A1 * | 2/2008 | Kozloff et al. | 705/2 |
| 2008/0159724 A1 * | 7/2008 | Purvis et al. | 386/126 |

OTHER PUBLICATIONS

Windows Media Player, Date 1992-2004, Microsoft Corp.Version 10.*

* cited by examiner

*Primary Examiner* — William L Bashore
*Assistant Examiner* — Meseker Takele
(74) *Attorney, Agent, or Firm* — Workman Nydegger (57) ABSTRACT

Methods and systems are provided for allowing a user to capture and edit electronic media on a single computing device. In one example, one or more features allow a user to simultaneously remove and recover segments of media without entering a complex editing stage. In one such example, the user may only be required to enter a single user input to remove and/or recover segments. In another example, one a feature allows a user to efficiently add a section of media to another section of media. For example, the user may add an audio track over a video track in a more efficient manner. In one illustrative example, the features are provided through a single user interface.

16 Claims, 6 Drawing Sheets

RECORDER USER INTERFACE

BACKGROUND

End-user media creation, for example, in the form of e-mail, blogs, podcasts, videoblogs, and photo-sharing is rapidly increasing. For e-mails and blogs, software comprising user interfaces is starting to make the process more user-friendly. Similarly, digital photo manipulation tools help fuel photo-sharing websites and tools. However, for projects that include time-based media like, for example, video and audio, the task of creation is still difficult and inefficient because the current paradigm is time-consuming and difficult.

Generally, a user must record a large quantity of media with a mobile device and then edit and finalize the media on a less portable computing device. Indeed, with current mechanisms for media capture, users must undergo the "capture, edit, then publish" paradigm. While some savvy end-users may learn to use the current inefficient software applications to edit and create media, such as audio journals and videos, it is time-consuming and complex. Even with less-complex software like for example, Apple® iMovie, users often do not have the time or patience to learn and master the techniques and features available on the software to edit their media. This results in the media sitting on the user's hard drive, unused and forgotten. For most users, even this level of sophistication for creation software is not necessary for casual recordings in the same way that the plethora of features available in Microsoft® Word® is not necessary for casual emails or blog entries. What is needed, therefore, are systems and methods for allowing a user to author media in a more efficient manner.

SUMMARY

Methods and systems are provided for allowing users to more efficiently create and finalize media on a computing device. In one example, a feature allows a user to undo and/or redo a particular section of media without entering a complex editing stage. The feature may be part of a software package available to the user, for example, as a user interface. Yet in another embodiment, the feature is presented as part of a hardware component. Providing users with such Undo/Redo functionality may provide more coherent, focused, and topical recordings.

In another example, a feature allows a user to efficiently add a section of media to another section of media. For example, the user may add an audio track over a video track in a more efficient manner. This feature may be part of a software package available to the user, for example, as a user interface. Yet in another embodiment, the feature is presented as part of a hardware component. A user may copy portions of other media to comment upon and share with other users. In one embodiment, several such features may be combined in the same hardware or software to allow a user to use them simultaneously, thus further helping avoid difficult editing and fueling an ecosystem of content sharing.

These and other aspects will become apparent from the following detailed description when taken in conjunction with the drawings. A more complete understanding of aspects may be acquired by referring to the following description in consideration of the accompanying drawings, in which like reference numbers indicate like features. Aspects are being described in terms of exemplary embodiments. Numerous other embodiments, modifications and variations within the scope and spirit of the appended claims will occur to persons of ordinary skill in the art from a review of this disclosure.

DETAILED DESCRIPTION

Exemplary Operating Environment

Figure 1:
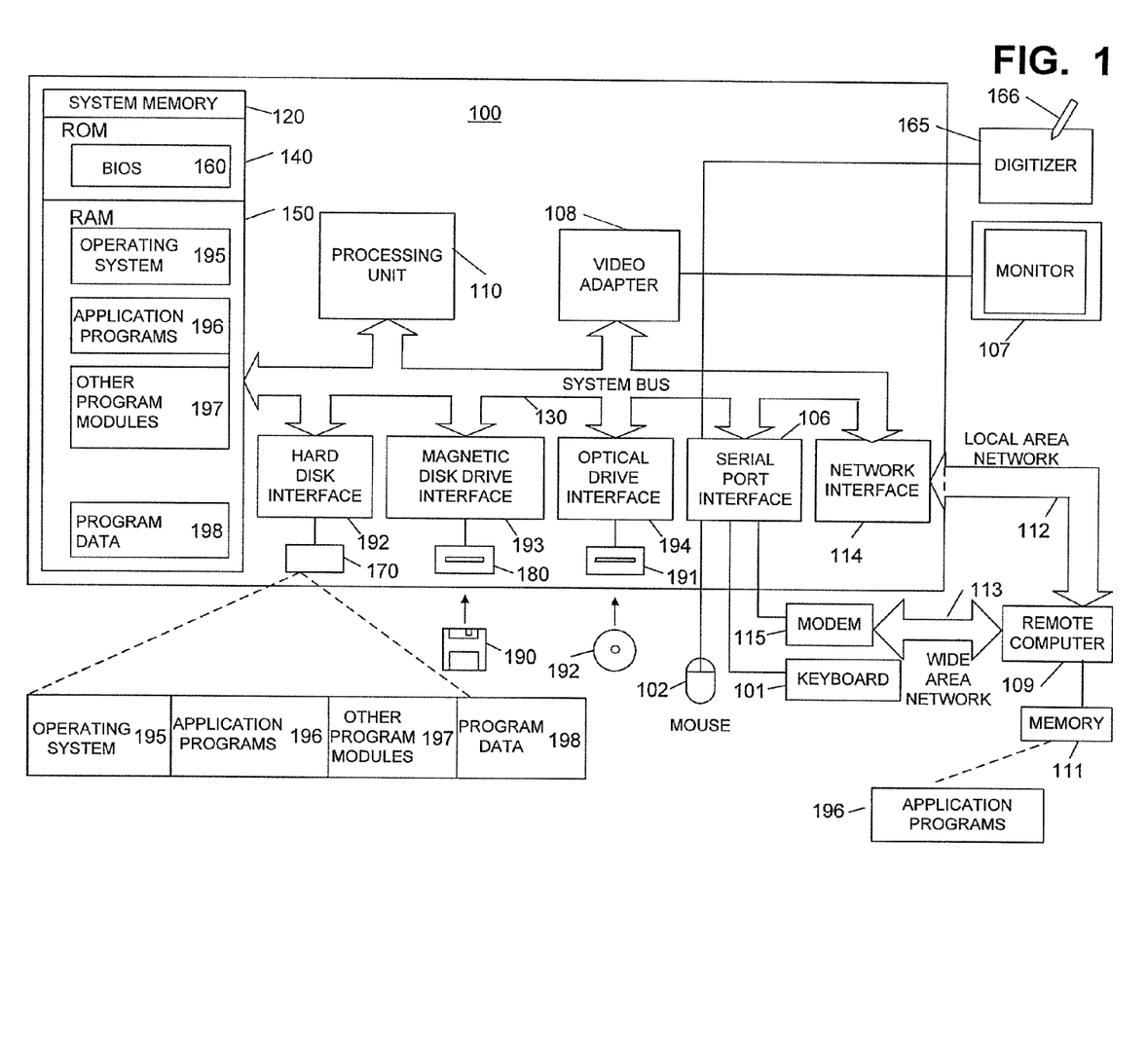
FIG. 1 illustrates an exemplary computer system in which embodiments may be implemented.

FIG. 1 is a functional block diagram of an example of a conventional general-purpose digital computing environment that can be used in connection with various input devices. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device according to the present invention to the computer 100. Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

Description of Illustrative Embodiments

Figure 2:
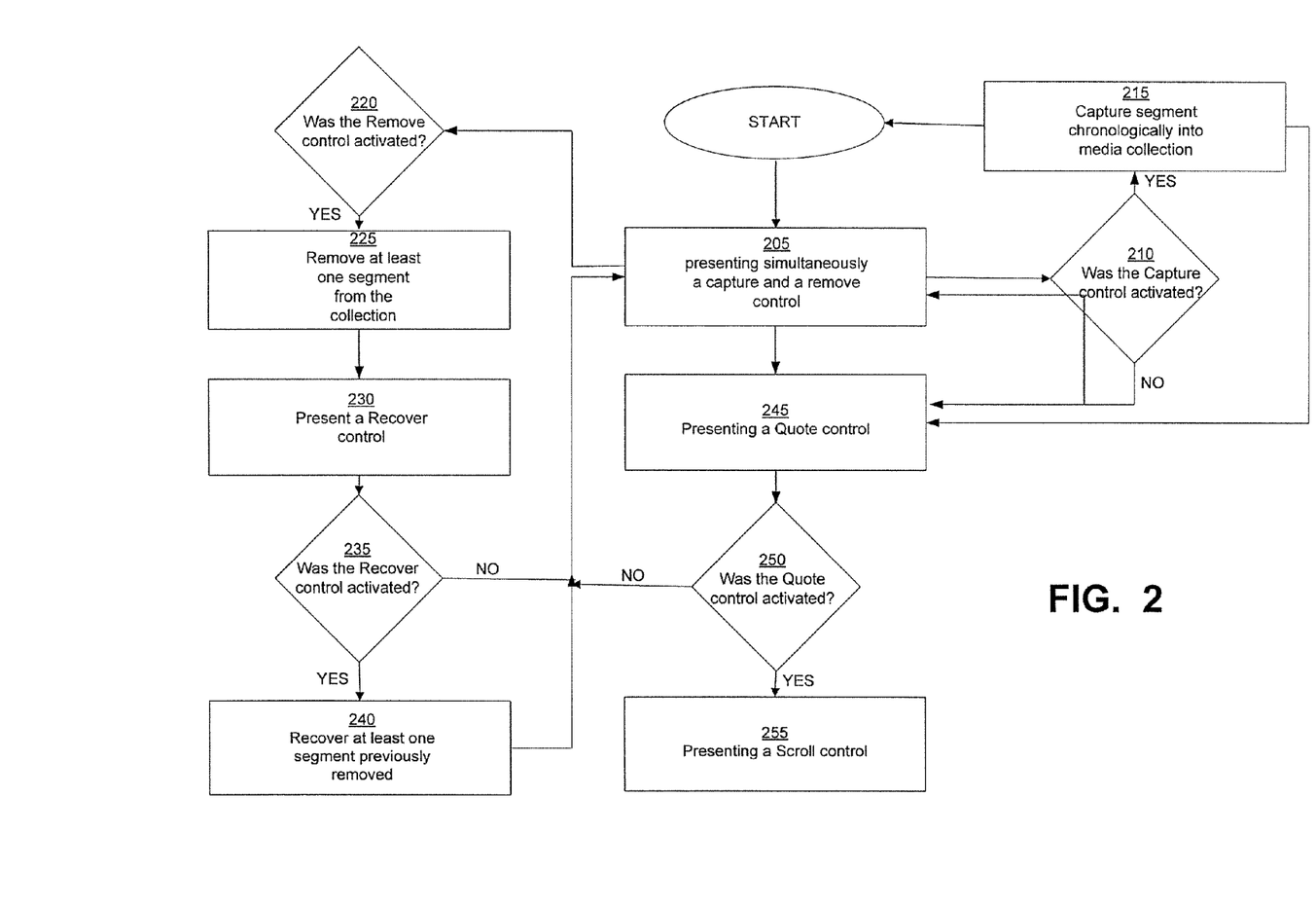
FIG. 2 is a flow diagram of an exemplary method of capturing and editing electronic media in accordance with various aspects.

FIG. 2 is a flow diagram of an exemplary method of capturing and editing electronic media in accordance with one embodiment of the invention. It is to be understood that the steps described in reference to the method may be carried out in any computing device having a processor, such as processing unit 110, a computer readable medium, such as memory 120, and at least one user input mechanism, such as microphone mouse 102. Exemplary computing devices may include properly equipped video camcorders, Dictaphones, traditional computing devices such as desktop or laptop computers, or the like. FIG. 3 shows illustrative screenshots of one particular embodiment for carrying out one or more steps described in FIG. 2.

Figure 3A:
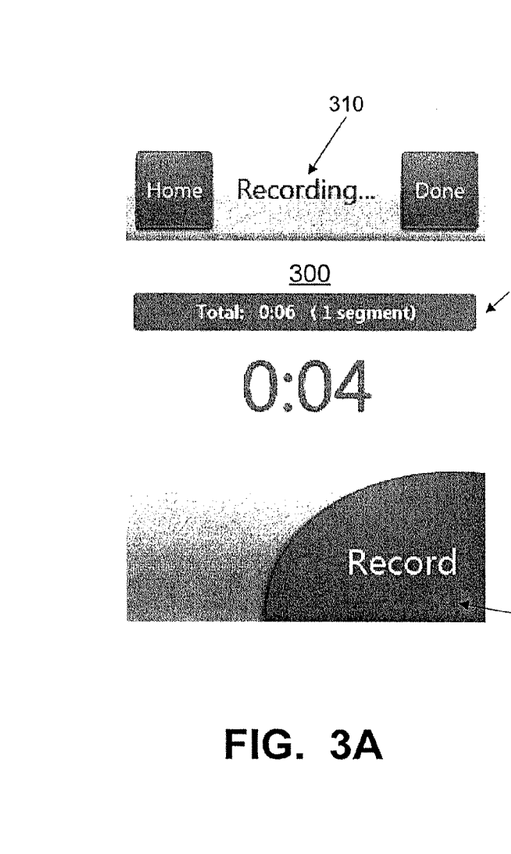
FIG. 3 shows illustrative screenshots of one particular embodiment for carrying out one or more steps described in FIG. 2.
Figure 3B:
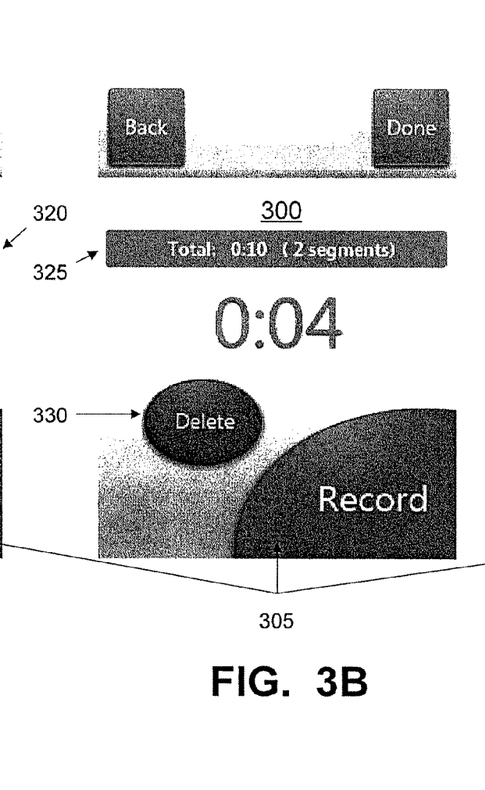
Figure 3C:
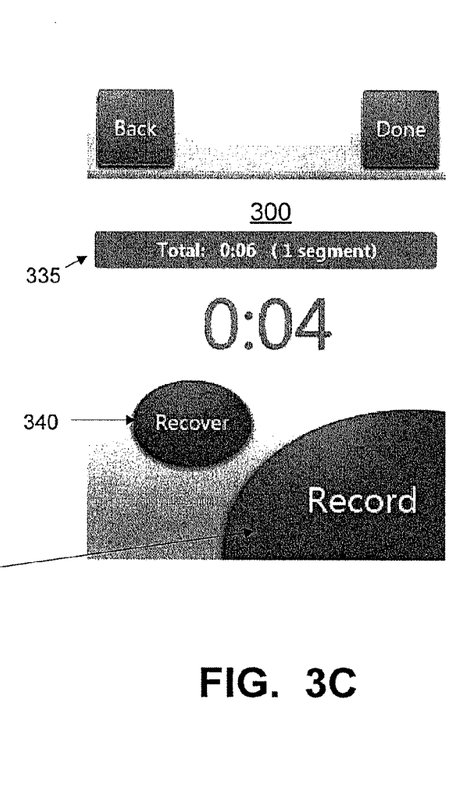

Specifically, FIGS. 3A-3C show an exemplary graphical user interface that may be displayed, for example, on monitor 107 of computer device 100. While the illustrative user interface is suited for capturing an audio recording, one skilled in the art recognizes that user interface 300 may be utilized for capturing video, or any type of electronic media. Similar to other electronic media capturing devices, graphical user interface 300, has a capturing control, such as a button 305, for capturing electronic media. The button may be a "soft button". In one such embodiment, the user may use an input device, such as mouse 102 to select the button. Yet, if the computer device includes digitizer 165, the user may use stylus 166 or a finger to select the button. Yet in other embodiments, button 305 may be a physical button, for example, on a keyboard or an external button on the outer casing or housing of any computer device, such as a camcorder-like device. As one skilled in the art will readily understand, any user-selectable mechanism that receives a user input to initiate the capturing of electronic media may serve as a capturing control. Additional functions of button 305 are described in more detail when discussing the exemplary screenshot in FIG. 3B.

As used herein "electronic media" refers to any media, such as for example, audio and/or video, in electronic form. In one embodiment, the electronic media comprises both audio and video. One skilled in the art readily understands that there are a great number of audio and video formats to choose from, and the exact format may be determined based on the computer device utilized, desired quality of the electronic media being captured, among a plurality of other factors which are not crucial to this disclosure.

Graphical user interface 300 may also have a task bar 310 or other mechanism for conveying information to the user and configured to receive one or more user inputs. For example, exemplary task bar 310 has buttons labeled "Home" and "Done", with which the user may select to go to an initial starting point or a final stage, respectively. The task bar 310 may be located anywhere in the user interface 300 and may comprise more or fewer buttons and/or other user-selectable elements to aid the user in the capturing and or editing of electronic media. Also, a status bar, such as status bar 320 may be displayed. As seen in FIG. 3A, status bar 320 shows that there is currently 1 segment of media recorded that is 6 seconds in length. Further, the user still has the record button 305 activated and currently has 4 seconds of electronic media recorded. Activation may occur as the user presses the button 305 and will be de-activated upon releasing the button 305. In other embodiments, the button 305 may require a user input to activate it and remains activated until it is pushed or otherwise selected again.

FIG. 3B shows a screen shot of the same illustrative graphical user interface taken shortly after the screen shot in FIG. 3A. As seen in FIG. 3B, the user has de-activated the record button 305 after 4 seconds of recording media. The 4 second segment was captured to a computer-readable medium and associated with the previous 6 second segment (see, e.g., the status bar 325 of FIG. 3b reflects there is a total of 10 seconds in the two segments). As used throughout the remainder of the specification, the collection of one or more associated segments of captured electronic media (for example, as shown in status bar 325) may be referred to as a media collection.

The user may then be simultaneously presented with at least two controls, such as a capture control and a remove control (see, e.g., step 205 in FIG. 2). The controls may be presented to the user through a user-selectable element, such as a button as described above, which may be software or hardware based. In one embodiment where one or more of the control are physical buttons, switches, etc., located on the exterior of a housing, the buttons may always be physically present, but may be disabled when one or more of the features are not available, thereby preventing an unintended activation. As seen in FIGS. 3A-3C, in one embodiment, the capture control may be the record button 305 as described in detail above. Upon activation of record button 305, at least one segment is captured chronologically into a media collection (see steps 210 and 215). For example, status bar 325 indicates that two segments that were chronologically recorded. As one skilled in the art will realize, the physical location of the captured segments on the computer-readable medium does not have to be proximately located, rather the segments may be located on different computer-readable mediums, so long as they are tagged or otherwise identified, albeit even maybe temporarily, as being associated and chronological to each other in this particular embodiment.

Upon capturing a segment in step 215, the process may be re-initiated and step 205 may be repeated. The number of repetitions may vary depending on, for example, the amount of memory available to capture electronic media, the user's preference, and/or receiving a user input indicating the process should not be re-initiated. Yet in other embodiments, one or more different steps may occur. For example, step 245 may occur (explained below) or step 205 may be repeated, for example, until step 215 occurs at least once. Returning to step 205, a remove control is also presented to the user simultaneously with the capture control. As seen in FIG. 3B, the remove control is the delete button 330 in the illustrative embodiment.

By treating a segment (the portion of electronic media recorded from one activation to de-activation of the capture control) as associated with but separate and distinct from another segment, the delete button 330 allows a user to delete segments and attempt to re-record them in a relatively efficient and quick manner. For example, step 220 may be implemented to determine if the delete button 330 was activated. If it is determined at step 220 that the delete button was activated at least one segment is removed from the collection (step 225). The removal may be performed without the user manually rewinding or otherwise determining the portion to be removed. Rather a segment or pre-determined number of segments will be removed. In one embodiment, the user may preview the segment before determining whether to remove it.

As seen in the illustrative screen shot of graphical user interface 300 shown in FIG. 3C, the delete button 330 has been previously activated. Accordingly, updated task bar 335 reflects the last segment recorded (4 seconds of captured media) was removed from the collection automatically. The removed segment, however, remains in a computer-readable medium. Therefore, only the first segment comprising 6 seconds of captured media remains in the media collection, but the removed segment(s) is not permanently removed from all storage devices. In this embodiment, upon activation of the delete button 330, a recover control (e.g., recover button 340) is presented to the user (step 230).

Upon activation of the recover button 340 (see steps 235 and 240), one or more segments that were removed from the collection are recovered and amended back into the collection. In the illustrated example, delete button 330 has been replaced by recover button 340. Yet in other embodiments, a delete button remains presented to a user along with the recover button, thus allowing the user to delete further segments and recover those segments that were removed from the collection. If the recover control is not activated, step 205 may be repeated. Yet in another embodiment, the recover control is still available in step 205. The number of repetitions may vary depending on any myriad of factors discussed above or known in the art. Yet in still further embodiments, other steps may be initiated as will be appreciated by those skilled in the art.

Figure 4A:
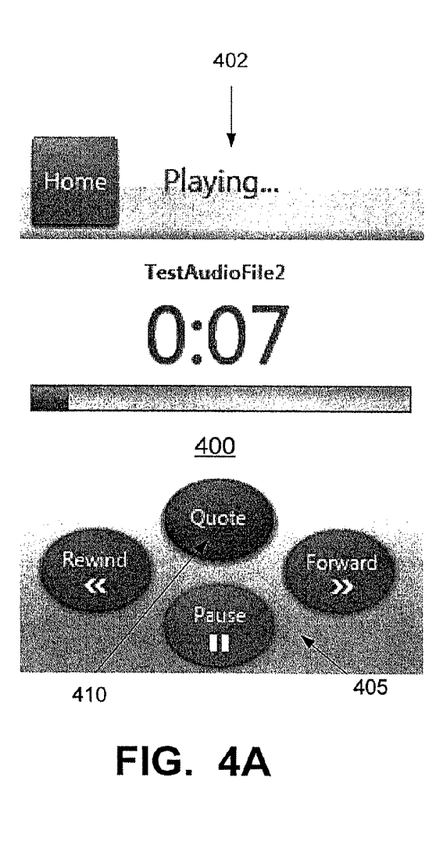
FIG. 4 shows illustrative screen shots of one exemplary implementation of a quote control.

In step 245, a quote control is presented to the user. The quote control may be displayed once the user has initiated listening and/or viewing the recorded segment(s), for example, after gathering a plurality of segments of electronic media such as described in relation to FIG. 3, or during one or more of the steps described above. FIG. 4 shows illustrative screen shots of one exemplary implementation of a quote control in graphical user interface 400. As readily seen in FIG. 4A, the user is currently playing an audio file named TestAudioFile2, and is approximately 7 seconds into the audio file (see task bar 402 indicating "Playing . . . "). A plurality of user controls, such as navigation controls 405, may be presented or available to the user. Navigation controls 405 may comprise user-selectable elements to allow the user to navigate through the one or more segments of electronic media, for example, captured in step 205. Similar to the user-selectable elements discussed above and throughout the remainder of the specification, the elements and controls may be software or hardware-based and may be physical buttons located on the exterior of a housing or casing.

As seen in FIG. 4A, one of the navigation controls 405 is a quote control 410. One skilled in the art will realize, the quote control 410 may be separate and distinct from the other navigation controls. For example, in one embodiment, the quote control 410 may be a physical button located on the exterior of a housing, while the navigation buttons 405, may be soft buttons located on a display device, such as monitor 107. In one embodiment, while navigating the media, for example, an audio recording, a user may press the quote button 410 to select an excerpt to copy into a new audio file or other electronic media. This may enable the user to create concise versions of their own lengthy recordings and/or create focused commentary on noteworthy quotes.

Figure 4B:
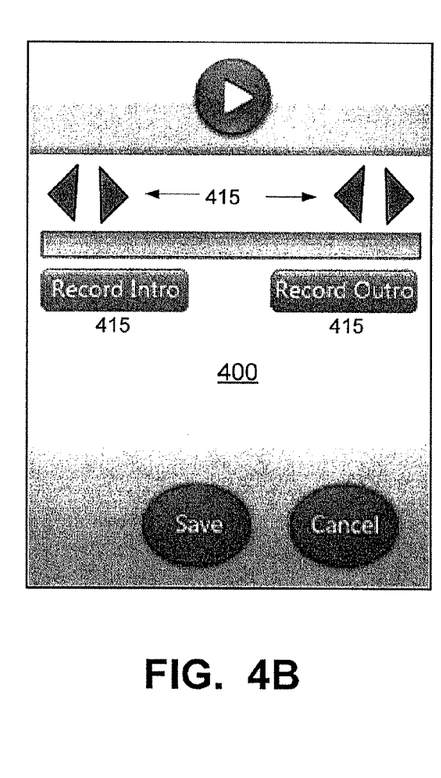
Figure 4C:
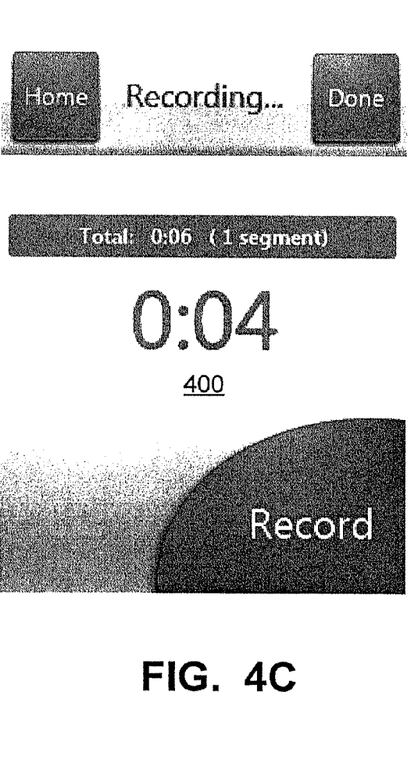

In the illustrated example, the user may capture an audio recording as shown in FIGS. 3A-3C, and initiated playing the recording as shown in FIG. 4A. When the user is listening to audio, the user may desire to copy the excerpt immediately after that portion has finished playing. So, in the illustrated embodiment, upon activating the quote button (step 250), the user may be taken to a "trim screen", for example, as shown in FIG. 4B. As seen in the exemplary trim screen shown in FIG. 4B, the past N seconds are taken, where N is a variable that can be informed with pause/sentence detection, etc. In one embodiment, the user may adjust the start and end points of the excerpt with a scrolling control (see, step 255).

In one embodiment, multiple scrolling controls may be provided to the user, such as arrows 415 to record commentary via a preamble ("intro") and/or postscript ("outro"). In one embodiment, upon selecting button 420 labeled "Record Intro" or button 425, labeled "Record Outro", the user may record an additional segment. For example, the user may be presented the exemplary interface shown in FIG. 4C, having functionality that may resemble that previously described in relation to FIG. 3A. At any point, the user can preview the result, which now contains the excerpt and commentary (if any).

Figures 5A, 5B:
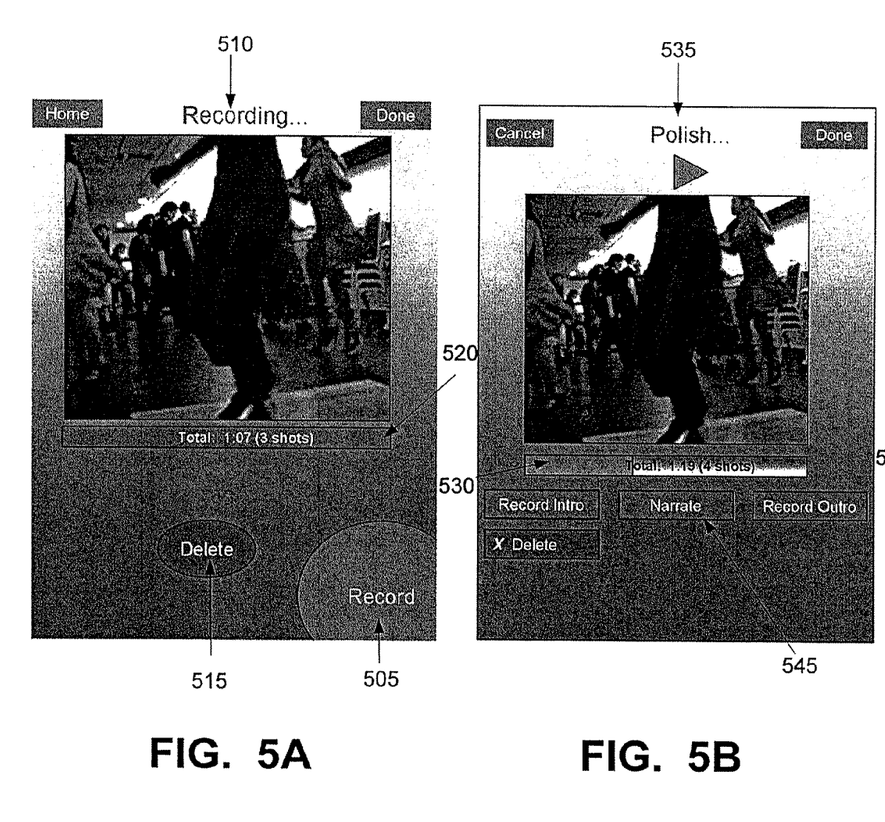
FIG. 5 shows exemplary screen shots of a graphical user interface directed towards the capturing of video electronic media.

As discussed above, the electronic media may comprise audio, video, or combinations thereof. FIG. 5 shows exemplary screen shots of a graphical user interface to more clearly illustrate features of select aspects of the invention directed towards the capturing of video electronic media. As seen in FIG. 5A, a user is capturing a segment of video similar to that described in relation to steps 205, 210 and 215. For example, the user has activated record button 505 to capture video as indicated in the task bar 510. A delete button 51 may also be available to the user to remove one or more segments as described, for example, in steps 220 and 225. As indicated by status bar 520, there are currently 3 segments (or clips) captured in the current session which total one minute and seven seconds.

FIG. 5B shows an exemplary screen shot taken after the user has captured an additional segment having a length of 12 seconds as indicated in status bar 530. The screenshot further indicates a polishing stage has been initiated, as indicated by task bar 535 stating "Polish . . . ". A plurality of user-selectable elements may also be presented to the user to allow editing capabilities within the same graphical user interface. For example, user controls 545 may include a "Record Intro", "Record Outro", "Delete", and "Narrate" buttons as previously described. As one skilled in the art will realize, more or fewer buttons or user-selectable elements may be presented to the user, depending on the embodiment.

Figure 5C:
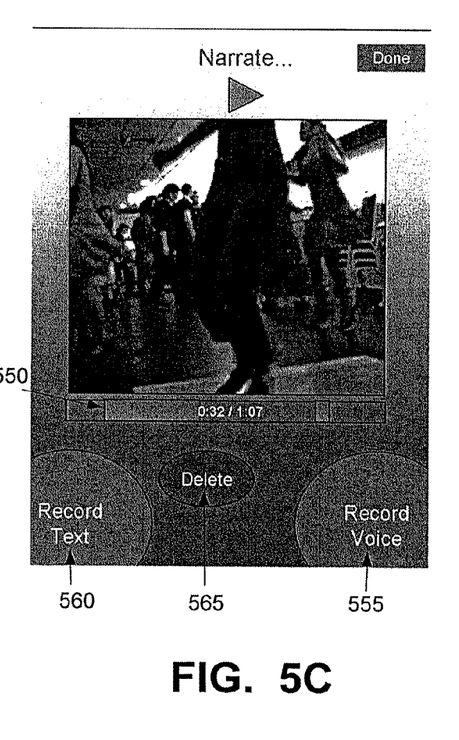

FIG. 5C shows an exemplary screen shot of the exemplary graphical user interface shown in FIG. 5B after the user has activated the "Narrate" button of the user controls 545. The user can play or otherwise navigate through the plurality of segments of captured electronic media. In one embodiment, the captured electronic media was the media previously captured in, for example, FIG. 5A-5B. In another example, it may be one or more segments captured previously using one or more steps described in regards to the method shown in FIG. 2. As seen with status bar 550, the user did not retain the segment being recorded when describing FIG. 5b, so the media collection comprises 3 shots totaling one minute and seven seconds in length (see FIG. 5a). As seen in FIG. 5c, the user is currently viewing at 32 seconds into the media collection.

As seen in FIG. 5C, using the same software and/or hardware device to capture the video media collection, the user may capture additional audio and or textual media onto the already collected video media. In the exemplary screenshot, an audio-capturing control, shown as Record Voice button 555 may be simultaneously presented along with a textual-capturing control, such as Record Text button 560. In other embodiments, the textual-capturing control and the audio-capturing control may be presented at different stages to the user. Yet in further embodiments, additional capturing controls may be presented to the user in place of, or in addition to the ones shown in the illustrative embodiment.

In one embodiment, the user may activate the "Record Voice" button 555 and narrate over the existing audio that may be present in the recording. Yet in other embodiments, the narrated original audio remains, but may be adjusted to a lower or otherwise different level during activation of button 555. In another embodiment, upon activation of the "Record Text" button 560, the video may be paused or otherwise stopped. The user may enter a textual input; through for example keyboard 101 or any other input device. The user may then determine the size of the text, location to display the text over the video, and/or the duration of the text among a myriad of other options well-known to those skilled in the art. The user may activate the delete button 565 to remove any undesired changes, such as textual and/or audio inputs in which the user no longer desires to remain in the media collection. As explained previously, the removal of such media is performed without the user having to define the removal points, but rather one or more actions will be removed.

Figure 6A:
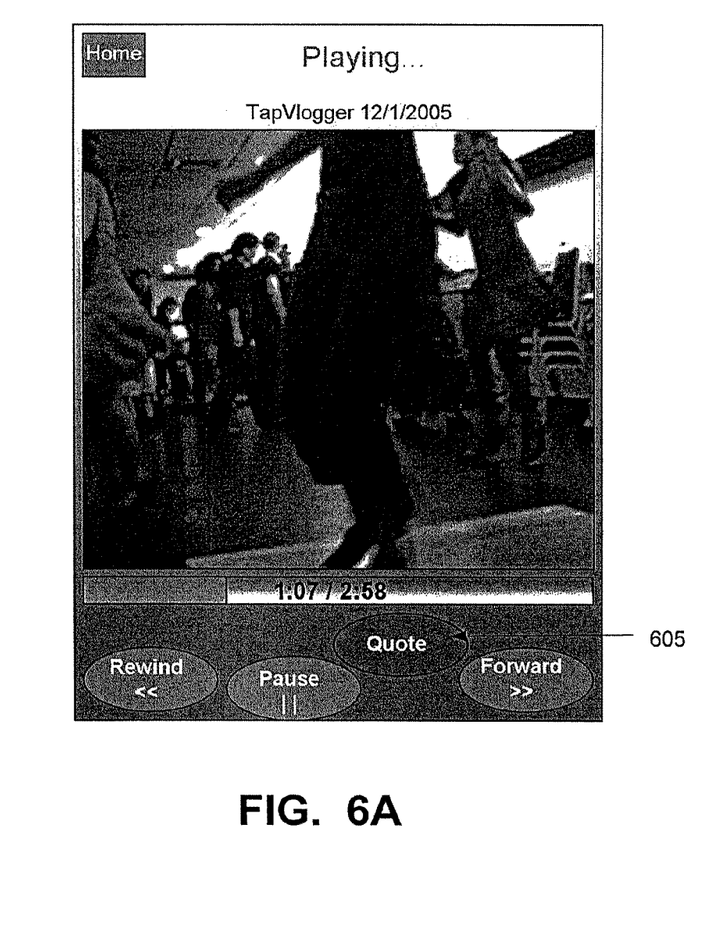
FIG. 6 shows exemplary screen shots of one possible graphical user interface according to one embodiment.
Figure 6B:
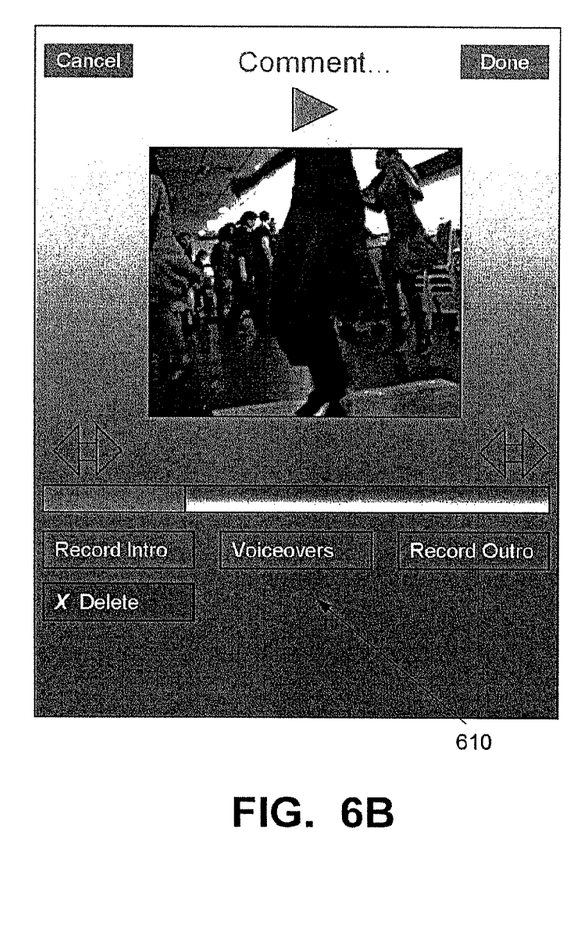

Aspects of the present invention also permit a user to quote excerpts of other videos into one another. For example, excerpts of a news story may be imported into a video journal entry to provide proper context for the journal entry. FIGS. 6A and 6B show exemplary screen shots of one possible graphical user interface that may be used. As seen in FIG. 6A, the user is viewing a video excerpt that may, for example, have been gathered from a third-party, such as for example, a music video vendor or news service. Upon pressing the Quote button 605, the user may be shown the screen shown in FIG. 6B. As seen in FIG. 6b, a plurality of user controls, such as controls 610 may be presented to the user. User controls 610 may comprise a "Record Intro", "Record Outro", "Delete", and, and "Voiceovers" buttons. Using one or more of the user controls, the user may edit the video excerpts, including adding new audio and/or video. For example, the user may adjust the start and end points, capture an intro and/or an outro, and narrate (voiceover) the video excerpt.

In another aspect of the invention, the created media collection or segments of electronic media may be captured, edited, and transmitted from a single computing device. In one such embodiment, the device may be a mobile device, such as a laptop or handheld computer. In yet another device, the device may be a cellular phone.

The present invention has been described in terms of exemplary embodiments. Numerous other embodiments, modifications and variations within the scope and spirit of the appended claims will occur to persons of ordinary skill in the art from a review of this disclosure.

The invention claimed is:

1. A computer-readable storage medium having computer-executable instructions that when executed perform a method of capturing and editing electronic media on a single computing device, the method comprising the step of:

providing a graphical user interface configured for capturing electronic media, the graphical user interface comprising at least the following: a media capture button that captures a media segment, a media delete button that deletes a media segment without the user defining removal points, a recover button that recovers deleted media segments, a home button navigates to an initial starting point in the media, a done button that navigates to a final stage in the media, a narrate button that allows a user to narrate over any existing audio in the electronic media, and a record voice button that records the user's voice, wherein each button is independently displayable and wherein at least two of the buttons are dynamically switchable, such that when a first switchable button is selected by a user, a second switchable button with different functionality is displayed in place of the first switchable button;

receiving at the graphical user interface a first user input indicating a selection of a first electronic media segment from among a plurality of electronic media segments, the first segment including a first tag indicating that the first segment is stored in a first location and that the first segment is associated with a second electronic media segment;

accessing the first selected media segment to preview the first electronic media segment;

receiving at the graphical user interface a second user input indicating that a portion of the first electronic media segment is to be combined with the second selected electronic media segment selected from among the plurality of electronic media segments, the second segment including a second tag indicating that the second segment is stored in a second, different location and that the second segment is associated with the first electronic media segment;

combining the portion of the first electronic media segment and the second selected electronic media segment to create a combined electronic media segment, wherein the combining includes accessing the first segment stored in the first location using the first tag and accessing the second segment stored in the second, different location using the second tag;

receiving at the graphical user interface a third user input indicating that audio user commentary is to be added to combined electronic media segment;

recording the audio user commentary on top of the combined electronic media segment, such that upon playback of the combined electronic media segment, the audio user commentary is concurrently audible with the combined electronic media segment's audio;

receiving at the graphical user interface a fourth user input indicating that the media delete button has been selected; and deleting both the electronic media segment that is currently selected as well as one or more different, associated electronic media segments that are stored on one or more different data storage mediums, wherein the associated media segments are associated with the currently selected media segment using tags, so those media segments that are associated with the currently selected media segment are deleted along with the currently selected media segment.

2. The method of claim 1, further comprising the step of: presenting to the user a preview control for allowing the user to preview at least one segment of the plurality of electronic media segments.

3. The method of claim 1, further comprising presenting to the user at least one navigation control for allowing the user to navigate the plurality of electronic media segments.

4. The method of claim 3, further comprising presenting to the user a scrolling control for inserting additional electronic media.

5. In a computer system having a graphical user interface including a display device and a user interface selection device, a computer-implemented method of allowing a user to capture and edit electronic media comprising the step of:

providing a graphical user interface configured for capturing electronic media, the graphical user interface comprising at least the following: a media capture button that captures a media segment, a media delete button that deletes a media segment without the user defining removal points, a recover button that recovers deleted media segments, a home button navigates to an initial starting point in the media, a done button that navigates to a final stage in the media, a narrate button that allows a user to narrate over any existing audio in the electronic media, and a record voice button that records the user's voice, wherein each button is independently displayable and wherein at least two of the buttons are dynamically switchable, such that when a first switchable button is selected by a user, a second switchable button with different functionality is displayed in place of the first switchable button;

receiving at the graphical user interface a first user input indicating a selection of a first electronic media segment from among a plurality of electronic media segments, the first segment including a first tag indicating that the first segment is stored in a first location and that the first segment is associated with a second electronic media segment;

accessing the first selected media segment to preview the first electronic media segment;

receiving at the graphical user interface a second user input indicating that a portion of the first electronic media segment is to be combined with the second selected electronic media segment selected from among the plurality of electronic media segments, the second segment including a second tag indicating that the second segment is stored in a second, different location and that the second segment is associated with the first electronic media segment;

combining the portion of the first electronic media segment and the second selected electronic media segment to create a combined electronic media segment, wherein the combining includes accessing the first segment stored in the first location using the first tag and accessing the second segment stored in the second, different location using the second tag;

receiving at the graphical user interface a third user input indicating that audio user commentary is to be added to combined electronic media segment;

recording the audio user commentary on top of the combined electronic media segment, such that upon playback of the combined electronic media segment, the audio user commentary is concurrently audible with the combined electronic media segment's audio;

receiving at the graphical user interface a fourth user input indicating that the media delete button has been selected; and deleting both the electronic media segment that is currently selected as well as one or more different, associated electronic media segments that are stored on one or more different data storage mediums, wherein the associated media segments are associated with the currently selected media segment using tags, so those media segments that are associated with the currently selected media segment are deleted along with the currently selected media segment.

6. The computer-implemented method of claim 5, further comprising the step of: presenting on the display device a preview control icon for allowing the user to preview at least one segment of the plurality of electronic media segments before determining whether to activate the remove control.

7. The computer-implemented method of claim 5, further comprising presenting on the display a navigation icon configured to allow the user to navigate the plurality of electronic media segments.

8. The computer-implemented method of claim 5, wherein the user adjusts the start and endpoints of the first electronic media segment.

9. The computer-implemented method of claim 5, further comprising: receiving an indication from the user that one or more electronic media segments is to be deleted from the combined electronic media segment; and deleting the one or more electronic media segments from the combined electronic media segment.

10. The computer-implemented method of claim 9, further comprising: receiving another indication indicating that the deleted portion is to be restored to the combined electronic media segment; and restoring the deleted portion to the combined electronic media segment.

11. The computer-implemented method of claim 9, further comprising: receiving another indication indicating that the one or more deleted electronic media segments is to be re-recorded; re-recording the one or more deleted electronic media segments; and inserting the re-recorded electronic media segments into the combined electronic media segment.

12. The computer-implemented method of claim 5, wherein the audio user commentary comprises at least one of an intro, a voiceover, and an outro.

13. A computer-implemented method of creating a video journal on a single computing device having a display device, a processor, and a computer-readable medium, the method comprising the steps of:
providing a graphical user interface configured for capturing electronic media, the graphical user interface comprising all of the following on a single user interface: a media capture button that captures a media segment, a media delete button that deletes a media segment without the user defining removal points by using pause/sentence detection, a recover button that recovers deleted media segments, a task bar that conveys information and receives user inputs, a home button navigates to an initial starting point in the media, a done button that navigates to a final stage in the media, a quote control button that captures audio quotes, a record intro button records an intro, a record outro button that records an outro, a narrate button that allows a user to narrate over any existing audio in the electronic media, and a record voice button that records the user's voice, wherein each button is independently displayable and wherein at least two of the buttons are dynamically switchable, such that when a first switchable button is selected by a user, a second switchable button with different functionality is displayed in place of the first switchable button, wherein the quote control button is displayed once the user has initiated listening and/or viewing the recorded segment and wherein the recover button is not displayed until after the delete button has been selected, such that the recover button replaces the delete button;
receiving at the graphical user interface a first user input indicating a selection of a first electronic media segment from among a plurality of electronic media segments, the first segment including a first tag indicating that the first segment is stored in a first location and that the first segment is associated with a second electronic media segment, the plurality of electronic media segments corresponding to the user's video journal;
accessing the first selected media segment to preview the first electronic media segment;
receiving at the graphical user interface a second user input indicating that a portion of the first electronic media segment is to be combined with the second selected electronic media segment selected from among the plurality of electronic media segments, the second segment including a second tag indicating that the second segment is stored in a second, different location and that the second segment is associated with the first electronic media segment;
combining the portion of the first electronic media segment and the second selected electronic media segment to create a combined electronic media segment, wherein the combining includes accessing the first segment stored in the first location using the first tag and accessing the second segment stored in the second, different location using the second tag;
receiving at the graphical user interface a third user input indicating that audio user commentary relating to the user's video journal is to be added to combined electronic media segment;
recording the audio user commentary on top of the combined electronic media segment, such that upon playback of the combined electronic media segment, the audio user commentary is concurrently audible with the combined electronic media segment's audio;
receiving at the graphical user interface a fourth user input indicating that the media delete button has been selected; and
deleting both the electronic media segment that is currently selected as well as one or more different, associated electronic media segments that are stored on one or more different data storage mediums, wherein the associated media segments are associated with the currently selected media segment using tags, so those media segments that are associated with the currently selected media segment are deleted along with the currently selected media segment.

14. The computer-implemented method of claim 13, further comprising the step of: presenting to the user a recover control for recovering at least one Previously Presented segment of electronic media.

15. The computer-implemented method of claim 5, further comprising receiving a fourth user input indicating that a portion of text is to be recorded and superimposed on the combined electronic media segment.

16. The computer-implemented method of claim 15, wherein the user determines at least one of the size of the text, the location to display the text over the combined electronic media segment, and the duration of the displayed text.

* * * * *